(12) United States Patent
Zahavi et al.

(10) Patent No.: US 6,886,020 B1
(45) Date of Patent: Apr. 26, 2005

(54) METHOD AND APPARATUS FOR STORAGE SYSTEM METRICS MANAGEMENT AND ARCHIVE

(75) Inventors: William Zahavi, Westborough, MA (US); Lee W. Sapiro, Hudson, MA (US); Saymai Thammavong, Marlborough, MA (US); Ron Arnan, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 646 days.

(21) Appl. No.: 09/641,227

(22) Filed: Aug. 17, 2000

(51) Int. Cl.[7] .............................................. G06F 17/30
(52) U.S. Cl. ....................................... 707/204; 711/161
(58) Field of Search ................... 707/1–10, 100–104.1, 707/200–206; 711/1–10, 160–175, 110–118, 150–155; 714/1, 6, 13, 7; 709/220–228

(56) References Cited

U.S. PATENT DOCUMENTS

| | | | | |
|---|---|---|---|---|
| 5,544,347 A | * | 8/1996 | Yanai et al. | 711/162 |
| 5,615,364 A | * | 3/1997 | Marks | 707/202 |
| 5,974,457 A | * | 10/1999 | Waclawsky et al. | 709/224 |
| 6,070,160 A | * | 5/2000 | Geary | 707/4 |
| 6,078,933 A | * | 6/2000 | Szalwinski | 707/204 |
| 6,189,080 B1 | * | 2/2001 | Ofer | 711/167 |
| 6,487,561 B1 | * | 11/2002 | Ofek et al. | 707/204 |
| 6,490,597 B1 | * | 12/2002 | Singh et al. | 707/204 |
| 6,490,598 B1 | * | 12/2002 | Taylor | 707/204 |
| 6,546,457 B1 | * | 4/2003 | Don et al. | 711/114 |

FOREIGN PATENT DOCUMENTS

| | | | | |
|---|---|---|---|---|
| EP | 0735760 | * | 2/1996 | 7/173 |
| EP | 0722236 A2 | * | 7/1996 | 9/8 |
| WO | WO 99/50765 | * | 10/1999 | 17/30 |
| WO | WO00/19337 | * | 4/2000 | 17/30 |

OTHER PUBLICATIONS

EMC Corporation, "EMC ControlCenter Workload Analyzer Product Guide," Version 4.3, pp. 1–240 (Jun. 2001), Rev. C.

* cited by examiner

*Primary Examiner*—Srirama Channavajjala
(74) *Attorney, Agent, or Firm*—Brian L. Michaelis; Joseph P. Quinn; Brown Rudnick Berlack Israels LLP

(57) ABSTRACT

A data management and archive method and apparatus, such as for implementation in an automated system to monitor and manage status, performance and configuration data for a plurality of networked storage components. Analysis and cross-correlation of data related to the plurality of storage components can be done individually, collectively and/or comparatively. A collection manager component of a workload analyzer is implemented to start and stop data collection in the context of a system comprising at least one storage component (or at least two networked storage components). The collection manager includes a command and control module that coordinates requests of data from at least one collection agent configured on at least one host connected to the storage component(s).

23 Claims, 13 Drawing Sheets

COLLECTION OF MGR BLOCK DIAGRAM

FIG. 6

METHOD AND APPARATUS FOR STORAGE SYSTEM METRICS MANAGEMENT AND ARCHIVE

FIELD OF THE INVENTION

The present invention relates to data storage systems, and more particularly to an automated system to monitor and manage status, performance and configuration of networked storage components.

BACKGROUND OF THE INVENTION

Information management systems, referred to herein as "workload analyzers," are known for monitoring and managing status, performance and configuration of networked storage components, such as a plurality of disk storage systems. Early implementations of workload analyzers were primarily available to and used by field engineering personnel commissioned with the tasks of analyzing performance, characterizing workload and undertaking capacity planning for disk systems in the context of large data storage centers comprised of a large plurality of disk storage systems (each system itself comprised of a large plurality of disks). Such early workload analyzers typically provided facilities for viewing selected parameters associated with each disk or disk system and creating graphs to correlate the parameters or metrics. However, such early systems typically were not accessible to users, nor were they designed to be "user-friendly". They generally did not provide access to nor manipulate historical data. Early systems typically made parameter access and system management possible only on a one-to-one basis, in that parameters could be viewed only for a single drive or system at a time.

One known, early workload analyzer system, known as SymTOP and used for limited workload analysis on SYMMETRIX disk arrays available from EMC Corporation, Hopkinton Mass., provided a field tool that systems engineers in the field used in day to day work to do performance analysis on the Symmetrix machines. SymTOP had the capability of collecting data on the service processor, which is an integral, control processor in Symmetrix. Systems engineers generally had to manually take the data with diskettes, bring it to their own machines (so as not to affect performance of the Symmetrix and its service processor, and then use the collected data as input into the SymTOP tool. The tool, which processed data gathered at the controller level, provided a graphics capability so that graphs of the static data could be automatically generated, for example to give a view of the well being of the machine at the time the data was collected.

For example, as illustrated in FIG. 1, graphs could be generated to view performance levels of key parameters, referred to as the "vital signs." Checking the vital signs with the SymTOP tool provided the key graphs that the factory suggested should be looked at for assessing system performance. The SymTOP tool was not configured to enable the system engineer or user to manipulate the system in any way that would affect parameters. It was simply a post-processing tool for analysis. It provided an information gathering tool useful to system engineers to try to identify bottlenecks, to do some workload characterization, and possibly prepare data for capacity planning. The three major capabilities of post-processing data analysis of these early workload analyzers were limited to: performance analysis, workload characterization and capacity planning.

Later versions of workload analyzers include the aptly named "Workload Analyzer" product, also available from EMC Corporation, Hopkinton Mass., for use with EMC SYMMETRIX disk arrays. The Workload Analyzer was/is configured to provide greater functionality, to more than just engineering personnel. Later workload analyzers are configured as customer products with more user-friendly capabilities. The primary difference between SymTOP and the later Workload Analyzer which provides greater functionality, is in the implementation architecture. While SymTOP got data from the service processor, Workload Analyzer gets data over a SCSI (Small Computer System Interface) channel, connected to a host. That is, Workload Analyzer, which typically runs as a process on another machine (i.e. not the service processor or a host) receives data from the Symmetrix through the host over the SCSI I/O (input/output) channel. In this manner the service processor is not tied up with data gathering and transfer responsibilities.

Additionally, the Workload Analyzer manages the data collection by communicating with a control center (known as the EMC Control Center or ECC). The ECC runs on the host, and the Workload Analyzer commands the ECC to collect data while specifying the kinds of data to be collected at any given time. Thus the ECC agent on the host, for example a Unix machine connected to the Symmetrix, manages collection and storage of data for analysis by the Workload analyzer. The data is retrieved for the Workload Analyzer, such as manually by loading a diskette or by using FTP (File Transfer Protocol), i.e. pseudo manual approaches. Files containing the data are transferred to storage accessible to the Workload Analyzer so that the data can be retrieved for generation of graphs and displays for purposes of system performance analysis.

Although historical data can be stored using these later workload analyzers, the data can not be flexibly collected in that the collection intervals are fixed (e.g. collections every 15 minutes or not at all), and can not be controlled except in the binary sense of on or off. Further, the data can be manipulated in only a limited fashion and only limited data is collected in that there is no configuration data available and the data typically contains only fixed, single interval data. Disadvantageously, like the early workload analyzers (e.g. SymTOP), parameter access and system management is possible only on a one-to-one basis, in that parameters can be viewed only for a single drive or system at a time. A user has to control differentiation between different machines providing data. That is, parametric information can only be obtained for a single storage system through the host resident agent and stored in a respective file and the user would have to manually collect and correlate the data from different machines.

Furthermore, with most known workload analyzers there is no useful organization of the data files in any way. The organization typically is that the data is put in a directory. The user has to maintain the directory in order to know where the data is located. Further, disadvantageously, there is no data management functionality to enable a user to perform useful cross-correlation of data being analyzed among a plurality of systems. The utility of previous workload analyzers was limited.

SUMMARY OF THE INVENTION

The present invention provides a data management and archive method and apparatus, such as for implementation in an automated system to monitor and manage status, performance and configuration data for a plurality of networked storage components. Analysis and cross-correlation of data related to the plurality of storage components can be done individually, collectively and/or comparatively.

According to the invention, a collection manager component of a workload analyzer is implemented to start and stop data collection in the context of a system comprising at least one storage component (or at least two networked storage components). The collection manager includes a command and control module that coordinates requests of data from at least one collection agent configured on at least one host connected to the storage component(s). The collection manager manages collection of data and effects file transfer (e.g. via FTP) of collected data according to a user specified policy, and maintains status of the data collected. The user specified policy according to the invention allows the user to specify data collection time periods (i.e. periodicity) as being one of: interval collection (minutes); hourly, daily "shifts"; weekly "shifts"; and monthly "shifts". The concept of shifts permits designation of time intervals for collection consistent with business work schedules wherein shifts are defined as contiguous hours in a day and wherein a day can have more than one shift.

A data manager component builds flexibly configurable archives of data received from the host resident collection agent(s) according to the user specified policy. The data manager receives ASCII data from the collection manager, converts that data to binary for updating archives, and converts "counters" to rates. That is, data is gathered or obtained based on monotonically increasing counters which are changed to rates by dividing the change in counter values by elapsed time. The data manager performs time density compression of the data for storage to the archives. Data collected in minutes (i.e. interval data), is converted to a base density unit of hourly data which can be archived per work shift as daily, weekly or monthly data in the time compressed archives.

The archives updated by the data manager according to the invention are constructed in a "self-describing format" wherein an ASCII version of the data is stored in a file having a specific file identifier suffix (i.e. ".TTP"). The converted binary version of the ASCII file is stored with a unique file identifier suffix (i.e.".BTP"), and the time density compressed periodic data is stored according to the common density unit of one hour in a file uniquely identified as "dateh.BTP." Although periodic data is converted to the common density unit, respective "policy" files are created and stored for each of daily, weekly and monthly data. In an implementation with a plurality of networked storage units, the archive can be distributed in and among the storage units, or outside of the networked storage units.

A performance view component according to the invention facilitates access to the archives, and data manipulation effecting enhanced performance analysis, workload characterization and capacity planning. The performance view components facilitate generation of factory and user defined views of monitored parameters. Graphical and tabular views can be flexibly implemented. Parameters from a system can be correlated using the performance view features, and parameters across machines can be correlated as well. System configuration(s) can be viewed via the performance view user interface. The performance view component can be used anywhere it is located. A data export facility permits monitored parameter data to be exported to other systems for analysis.

Features of the invention include a system and method that facilitates flexible data collection and analysis across a plurality of networked storage devices. A broad range of system and networked system parameters can be monitored, manipulated and archived and accessed to conduct advanced performance trend and capacity analysis. Multiple parameters can be correlated to analyze the impact of configuration changes. A self-describing data format for archived data provides for maximized parameter storage and retrieval in a distributed data store.

BRIEF DESCRIPTION OF THE DRAWINGS

These and other features of the present invention will be better understood in view of the following detailed description taken in conjunction with the drawings, in which:

FIG. 6 is a user interface screen illustrating policy definition for a policy file of FIG. 3 according to the invention;

Appendix A is a listing of system metrics processed by the workload analyzer and control center for a storage network, according to the invention.

DETAILED DESCRIPTION

Figure 1:
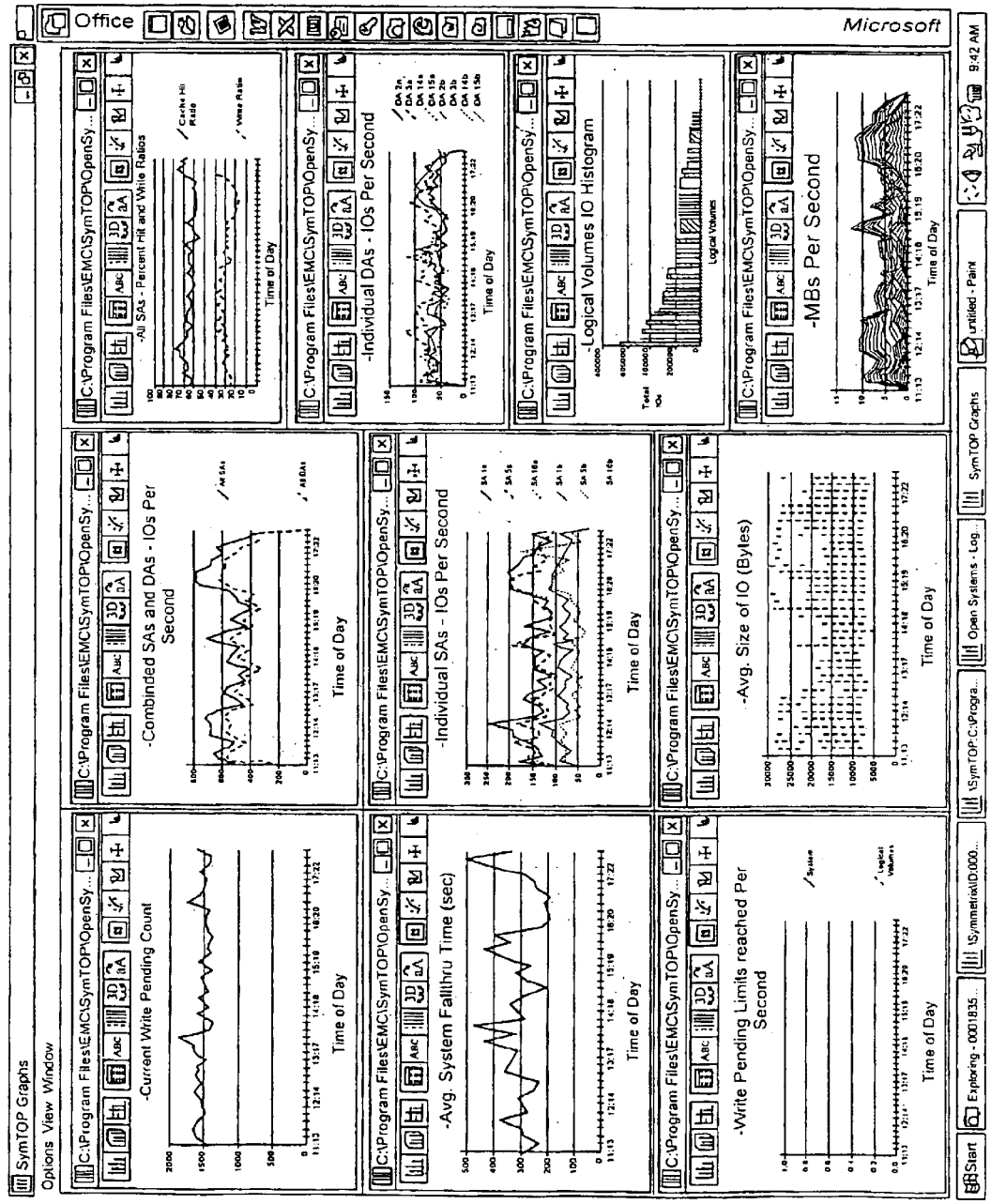
FIG. 1 is an illustration of graphs generated using a workload analyzer according to the prior art.
Figure 2:
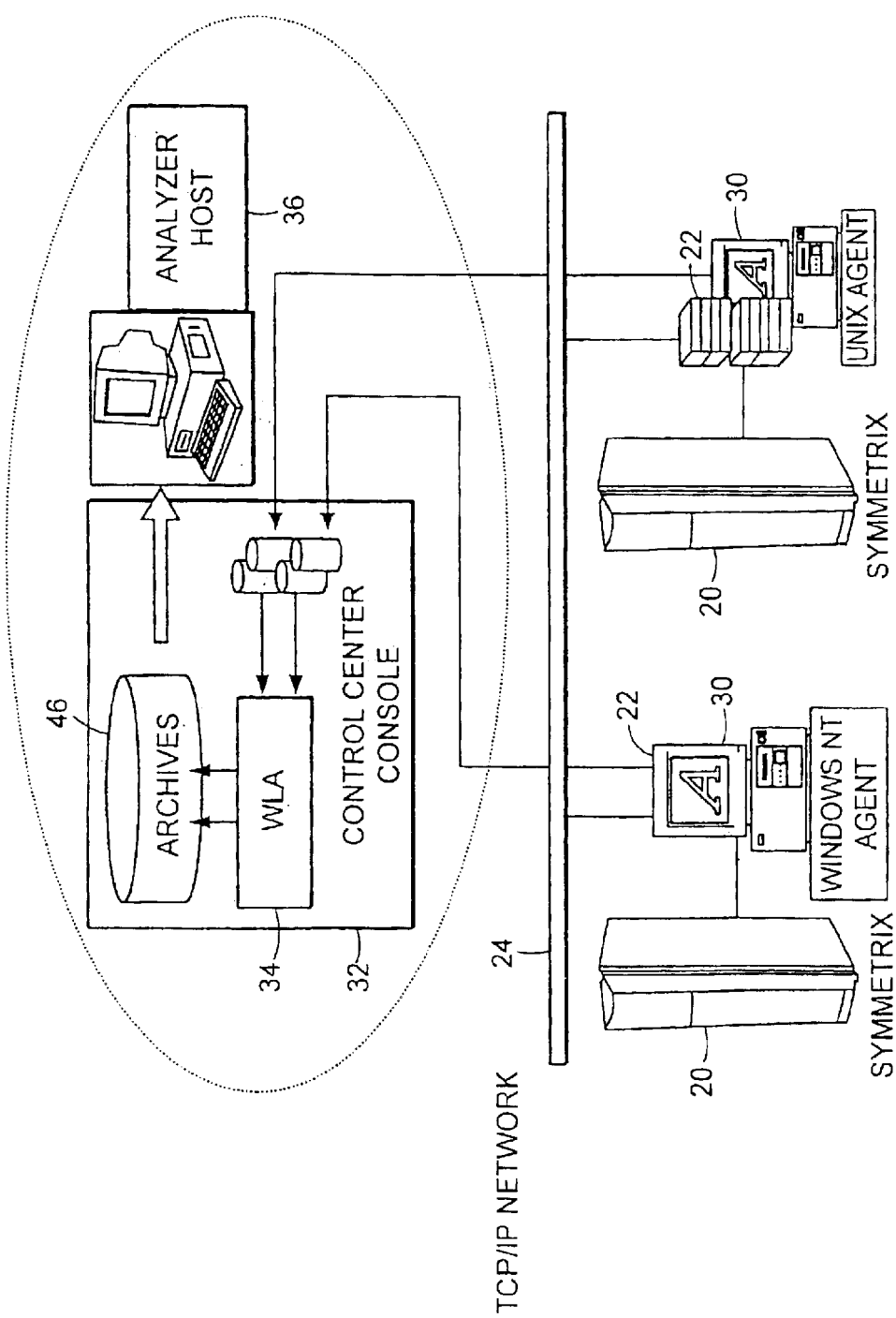
FIG. 2 is block diagram of topology of a workload analyzer and control center for a storage network, according to the invention.

A data management and archive method and apparatus according to the invention, is implemented in an illustrative embodiment described herein in an automated system to monitor and manage status, performance and configuration data for a plurality of networked storage components, such as illustrated in FIG. 2. The networked storage components in this illustrative embodiment are a plurality of Symmetrix disk storage arrays 20. A plurality of host systems 22 are configured in a network 24, such as any of various Local Area Network (LAN) for example Ethernet, or Wide Area Networks (WAN) based on interconnectivity protocols such as TCP/IP.

The host systems 22 are generally any of various types of computer systems that store and process data to and from the Symmetrix arrays. For example, host systems might include computers from IBM, Hewlett-Packard, Sun Microsystems or other vendors, running operating systems such as UNIX or Windows NT. The hosts 22 may communicate with the Symmetrix arrays across any of various input/output (I/O) technologies known in the art and supported by Symmetrix "Directors" which handle Symmetric I/O, such as SCSI, Ultra SCSI, ESCON and Fibre Channel.

The data management and archive method and apparatus according to the invention is implemented in a configuration such as described hereinbefore via collection manager, data manager and archive components incorporated in the configuration and functioning as described hereinafter. In this illustrative embodiment, one or more of the hosts 22, is configured with an agent 30. The agents 30 each invoke system calls running in microcode on the Symmetrix systems connected to it to gather data about the Symmetrix system attached to the host. The agents gather information about the system (e.g. system write pending count), logical volumes in the system (e.g. volume number, reads/writes per second), Directors in the systems (e.g. director number, read misses per second, system write pending per second, device write pending per second), and individual disks in the system (e.g. device name, total SCSI command per second, read commands per second). An illustrative list of the metrics gathered is set forth in Appendix A hereto.

Configuration of the Symmetrix connected in the network 24 is handled using an EMC Control Center (ECC) 32 as known in the art. The ECC effects a storage management solution in the form of a family of applications that provides extensive user management of storage components across the network. ECC includes a graphical user interface (GUI) "console" and an ECC Manager. The ECC Console provides an overview of system configuration and access to information about each of the components in the configuration. Various control applications can be launched from the ECC Console. The ECC Manager provides convenient access to internal configuration information about each of the arrays in the networked storage components, as well as operational status and realtime performance information. Using the ECC Manager an administrator can access a wide range of component level information to set thresholds, monitor alerts, and graph current performance metrics (such as detailed hereinabove) for each Symmetrix component, including logical volumes, Directors, and physical devices.

A Workload Analyzer (WLA) 34 according to the invention is among the applications that can be launched from the ECC console 32. The WLA according to the invention, is more than a post-processing tool for analyzing the realtime performance data gathered by the host resident agent(s). The WLA, as described herein comprises a collection manager including a command and control module and a data manager, and archive components incorporated in the configuration which provide significantly more robust data collection, management and utilization than heretofore known. The WLA can be implemented in conjunction with a analyzer host 36 that may be independently configured to facilitate interface with the WLA as a dedicated performance analysis and configuration tool. Alternatively, the WLA could be accessed and manipulated as described hereinafter through the host systems 22.

Figure 3:
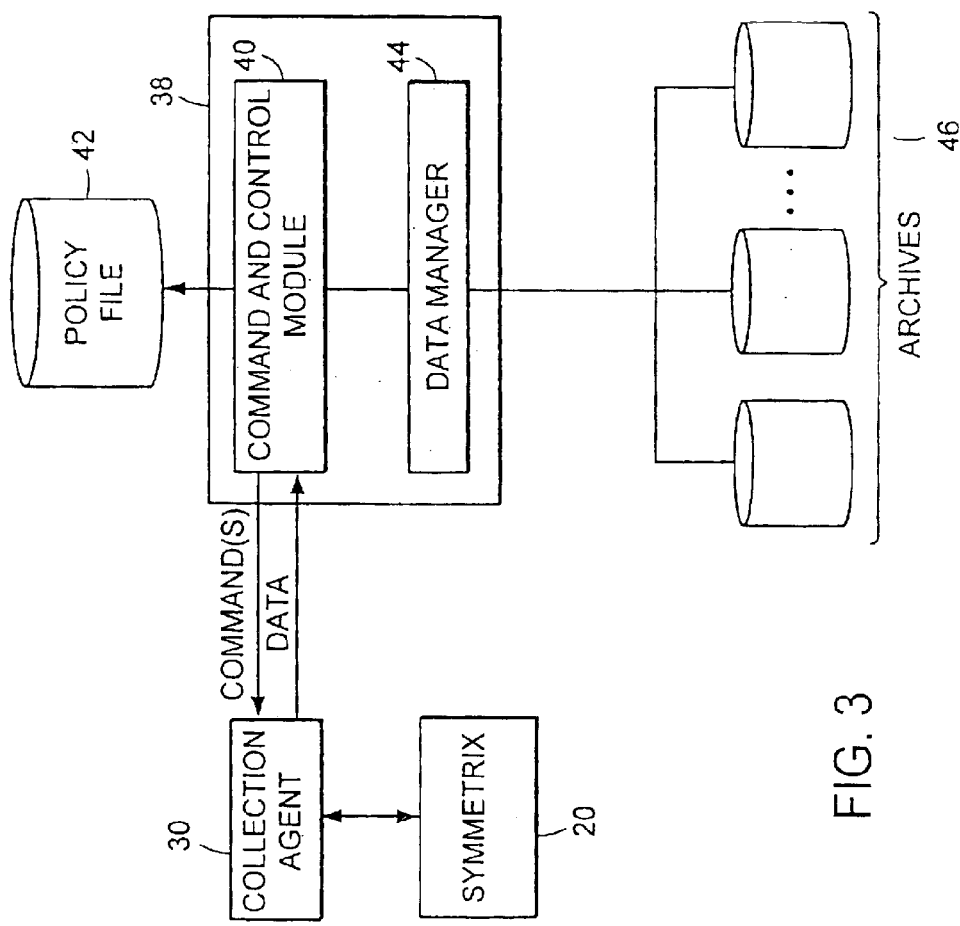
FIG. 3 is a functional block diagram of a collection manager of the workload analyzer of FIG. 2.

The collection manager component 38 of the workload analyzer according to the invention, as illustrated in FIG. 3, is implemented to start and stop data collection in the context of the system comprising at least one storage component (or at least two networked storage components).

Figure 4:
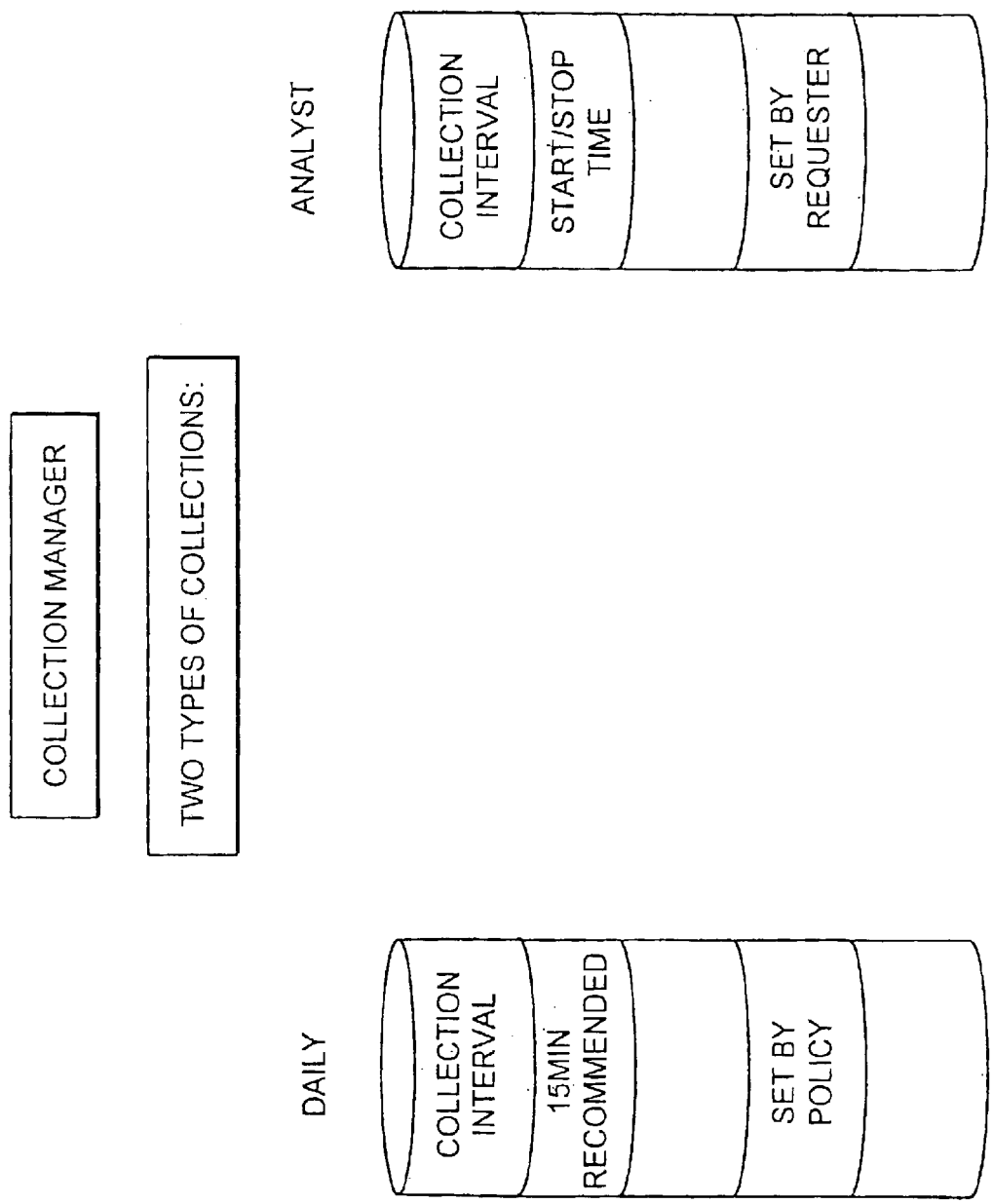
FIG. 4 is an illustration of two types of data collection performed by the collection manager of the workload analyzer of FIG. 2.

The collection manager 38 includes a command and control module 40 that coordinates requests of data from at least one collection agent 30 configured on at least one host connected to the storage component(s), e.g. the Symmetrix. The command and control module 40 sends commands to the agent 30. The agent has an Application Program Interface (API) to the microcode running on the Symmetrix which builds tables of Symmetrix operating parameters (Symmetrix related metrics) during the normal course of operation. Via commands from the command and control module to the agent to start or stop data collection, the agent invokes system calls to the Symmetrix to obtain the data for transfer to the collection manager. The command and control module also issues periodic requests for the data/metrics. Two types of data collection are effected, as illustrated in FIG. 4, including daily collections and analyst collection. Daily collections are automatic collections that are set up by a user establishing "policy" as described hereinafter. Daily collections are run automatically according to the policy specified intervals with no continued user interaction. Analyst periodic collections on the other hand, are on-demand user requests that do not run automatically. That is, a user can request metrics during some specified interval and set a start/stop time for the collection. Multiple user requests or analyst collections can be simultaneously requested, which are handled independent from the periodic, automatically run daily collections.

The collection manager 38 manages collection of data and effects file transfer (e.g. via FTP) of collected data according to a user specified policy, and maintains status of the data collected. A Policy File 42 (FIG. 3) is accessed by the command and control module 40 to obtain the user specified policy which according to the invention allows the user to specify data collection intervals or "shifts" (i.e. periodicity) as being one of: interval collection (minutes); hourly, daily shift(s); weekly shift(s); and monthly shift(s). Accordingly, metrics can be collected at different periods for flexibly configurable performance analysis.

Figure 5:
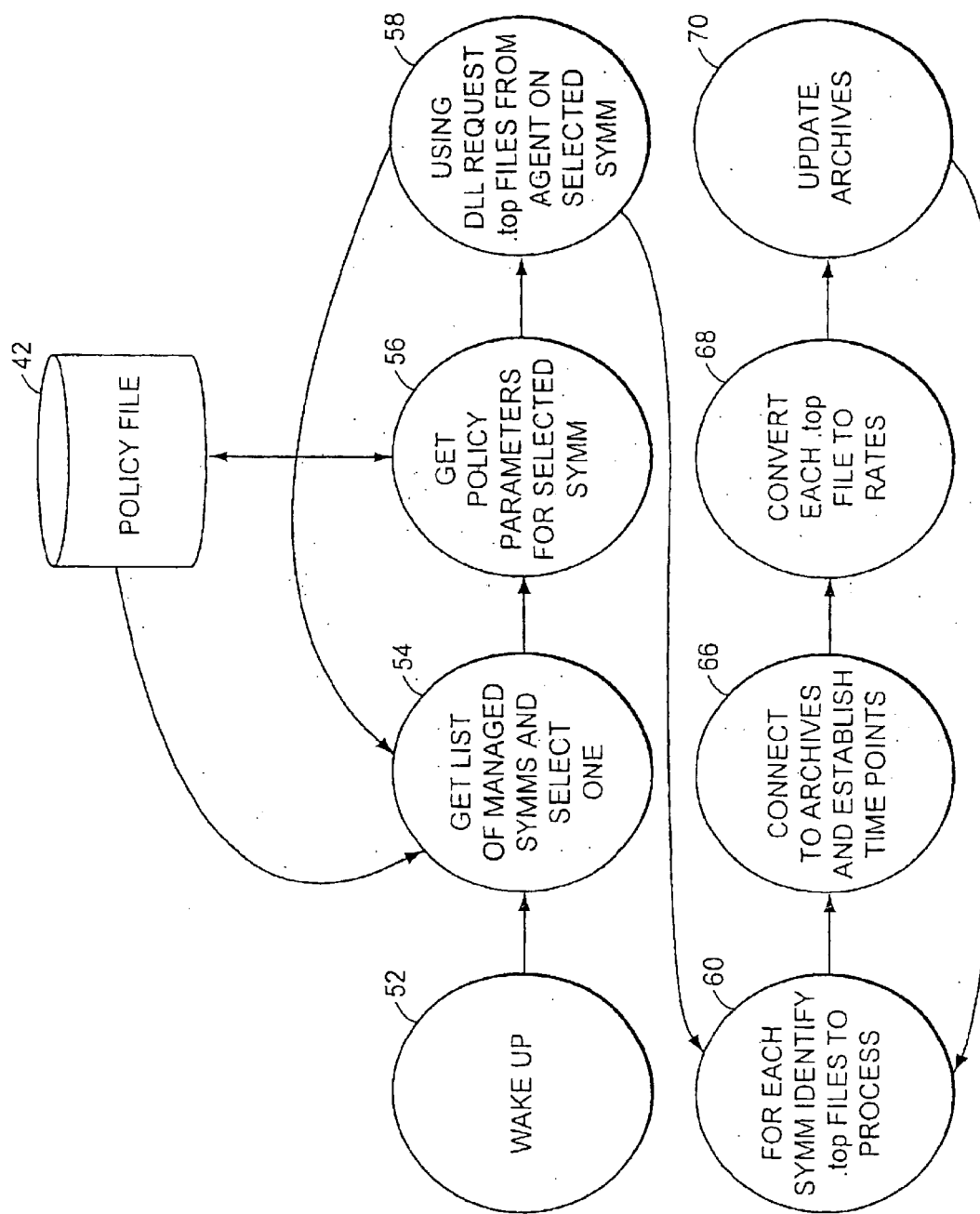
FIG. 5 is a state diagram illustrating states in collection management according to the collection manager of FIG. 3.

Functionality of the collection manager is illustrated in the collection manager state diagram of FIG. 5. When the collection manager "wakes up" 52 and requests data/metrics via the agent, a list of configured storage devices (Symmetrix or "Symm" in the illustrative embodiment) is perused 54 to select one of the Symmetrix being managed. The list of managed Symmetrix is available in the Policy file. The policy parameters for the selected Symmetrix are then obtained 56. Using a Dynamic Link Library (DLL) module data files from the selected Symmetrix are obtained 58 from the agent handling that Symm. For each Symm the appropriate files are identified for processing 60, i.e. conversion and updating the archives. In this illustrative embodiment, Symm metrics files for collection are text files identified or designated using a suffix. ".top". A data manager component (44, FIG. 3) connects 66 the collection manager to the archives (46, FIG. 3), data conversion is effected 68 as described herein, and the archives are updated 70.

Figure 6:
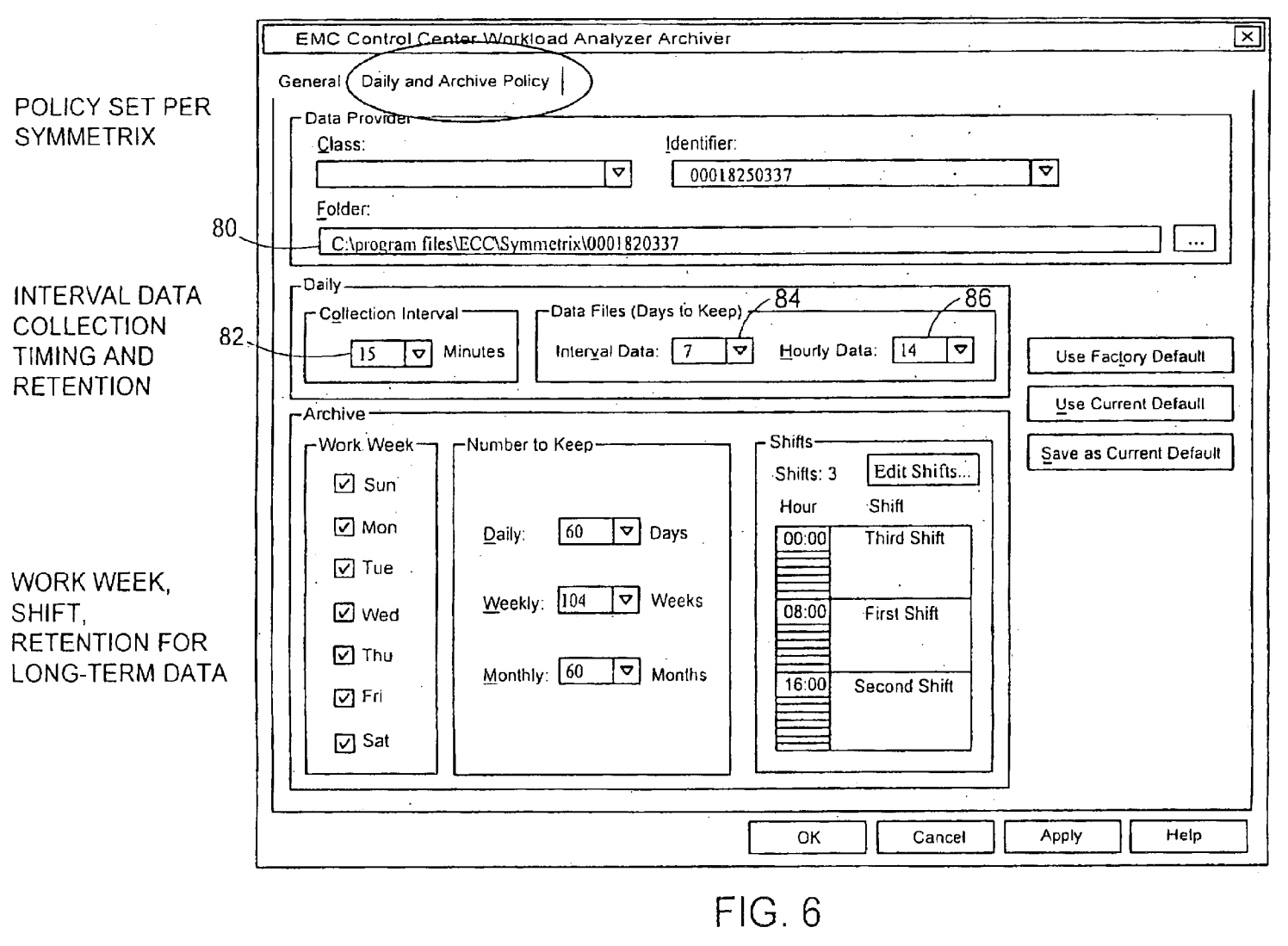
Figure 7:
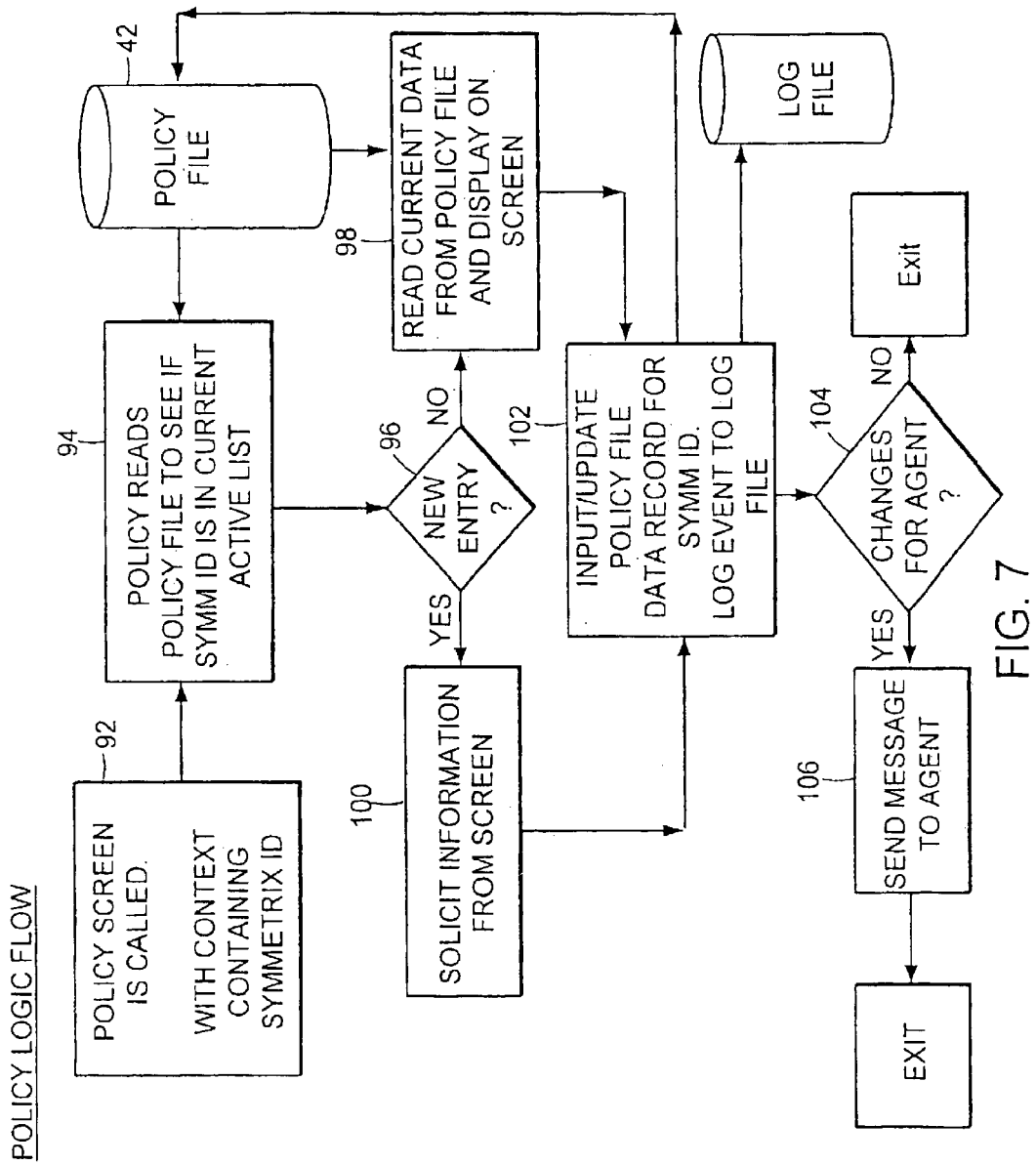
FIG. 7 is a block diagram illustrating policy logic flow according to the invention.
Figure 8:
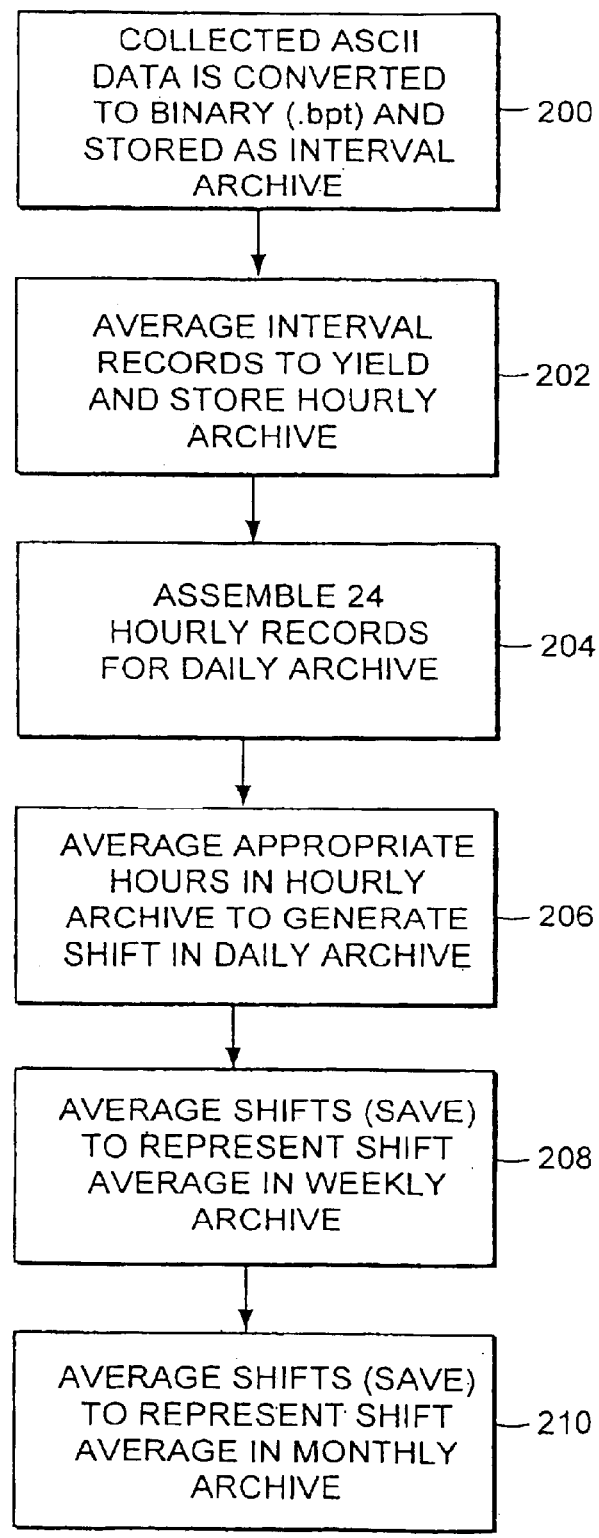
FIG. 8 is a functional flow diagram of a data manager component of the workload analyzer of FIG. 2.

Policy in the policy file 42 is set by user selection and interface to policy logic as illustrated in FIGS. 6 and 7. A user defines policy by interfacing with a collection policy user interface (FIG. 6). Policy is set per each Symmetrix. The user interface receives user specified fields for defining where to put data 80 coming from a particular Symm data provider (indicated by the "Identifier field). Via the user interface policy is specified for interval data collection timing and retention. As illustrated, collection timing intervals can be specified 82 (the default is 15 minute intervals) for Daily collection type collections. Retention timing, i.e. how long the data is retained, can be specified for interval data 84 and hourly data 86. Shifts that define the hours of each of the business shifts for which data will be grouped within the daily, weekly and monthly archives are also specified.

Policy logic flow is illustrated in FIG. 7. A policy routine calls the Policy screen 92 which comes up with an available list of Symmetrix Identifiers under management. The policy routine reads the policy file to check 94 if the specified Symm ID relates to an active Symmetrix. The policy routine is then in a condition to receive any new entry 96 information specified by a user via the policy user interface. If there is no new information, the current information is read 98 (i.e. for the data provider identified) from the policy file and is displayed on the policy user interface screen.

If the user wants to enter new policy information, the information is read from the interface screen 100. The new information is input 102 to the policy file for updating (or creating) the record for the Symm identified. Updating or input to the policy file is also an event that is logged typically in a system log file. If the new information entered by the user is not information that represents a change that should be received by the agent, the policy routine is exited. If there is a change that affects the agent 104, e.g. a collection interval for the identified Symm is changed, then a message is sent 106 to the agent and thereafter the policy routine is exited.

The data manager component 44 of the collection manager performs computations (of derived metrics as described hereinafter), and builds flexibly configurable archives 46 of data received from the host resident collection agent(s) according to the user specified policy. The destination of the data archived per data provider (Symm) can be specified by the user so that each data provider may have an independent location for its archives (i.e. the archives can be distributed). The data manager 44 receives ASCII data from the collection manager, converts that data to binary for updating archives, and converts "counters" to rates 200. That is, the information received is in the form of monotonically increasing counters (in ASCII) that must be converted to rates. The data manager converts to rates by dividing the difference in counter values by elapsed time as a function of the intervals specified in the policy. The data manager performs time density compression of the data for storage to the archives. Data collected in minutes (i.e. interval data), is converted to a base density unit of hourly data which can be archived as daily shifts, weekly shifts or monthly shifts data in the time compressed archives.

The data manager directly interfaces to the archives, so it stores a Daily archive by averaging interval records (4 interval records are averaged if the default 15 minute agent polling interval is used) to create and store an Hourly archive 202. Twenty four hourly archives are assembled to create a Daily archive 204. Shifts are defined by the user by specifying hours during which data is collected and pertinent. The hourly records in the Hourly archive that are appropriate to a defined shift are averaged to generate a Shift record in the Daily archive 206. The same Shifts in each Daily archive are then averaged to represent a shift average in a Weekly archive 208. The same shifts are averaged over time to represent the Shift average in the Monthly archive 210.

Accordingly, in an illustrative example, the data manager and collection manager are used as follows. From the WLA Collection Manager, the WLA agent polling interval is set for 15 minutes (default) and a time is defined, 12:05 AM (default), for when the Daily data is transferred from the WLA agent host to the WLA Collection Manager host (it should be noted that the agent host and collection manager or analyzer host could be the same system). At 12:00 AM each day the WLA agent begins to poll for statistical data at 15 minute intervals. The data is stored in ASCII format as Daily data. For a 15 minute polling cycle a Daily data collection contains 96 records—four records for each hour. At 12:05 AM (12:05 AM is the default time that can be changed from the WLA Collection Manager) the previous day's Daily data is transferred to the WLA Collection Manager. The Daily data is directly converted to a binary .btp file and stored as an Interval archive. The Interval archive contains the same number of records as the Daily data (96 in this example). A Daily archive is created by averaging every four interval records until 24 hours are represented in the Hourly archive. The daily 9:00 AM record is the average of the 8:15, 8:30, 8:45, and 9:00 Interval archive records for the same day.

Based on the definition of a Shift in the policy, the appropriate hours in the Hourly archive are averaged to create a shift record stored in the Daily archive. The hourly records from 8:00 am to 4:00 p.m. for example, are averaged to create a single first-shift record if this was the definition of the first-shift. Each shift in the Daily archives is averaged with the same shift for each day of the current week until there is an average represented for each of the shifts in one Weekly archive. The weekly first-shift record is the average of the first-shift records in each of the Daily archives created for the week. Each shift in the Daily Archives is averaged with the same shift for each day of the current month until there is an average represented for each shift in one Monthly archive. The monthly first-shift record is the average of the first-shift records in each of the Daily archives created for the month.

At the end of a week, the Weekly archive is closed and saved. At the start of the following week a new Weekly archive is created. At the end of a month, the Monthly archive is closed and saved. At the start of the following month a new Monthly archive is created.

Figure 9:
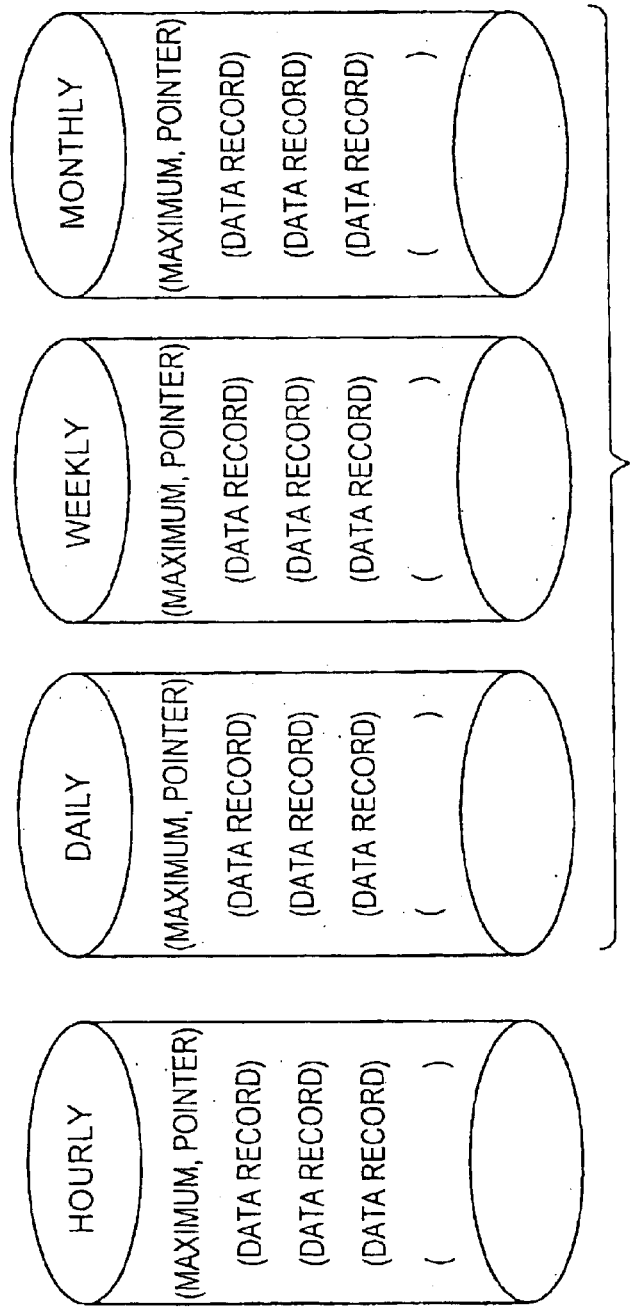
FIG. 9 is a diagram illustrating performance archives according to the invention.

The archives updated by the data manager according to the invention, and illustrated in FIG. 9, are constructed in a "self-describing format" wherein an ASCII version of the data is stored in a file having a specific file identifier suffix (i.e. ".TTP"). The converted binary version of the ASCII file is stored with a unique file identifier suffix (i.e.".BTP"), and the time density compressed periodic data is stored according to the common density unit of one hour in a file uniquely identified as "dateh.BTP." Although periodic data is converted to the common density unit, respective "policy" files are created and stored for each of daily, weekly and monthly data. In an implementation with a plurality of networked storage units, the archive can be distributed in and among the storage units, or outside of the networked storage units.

Figure 10:
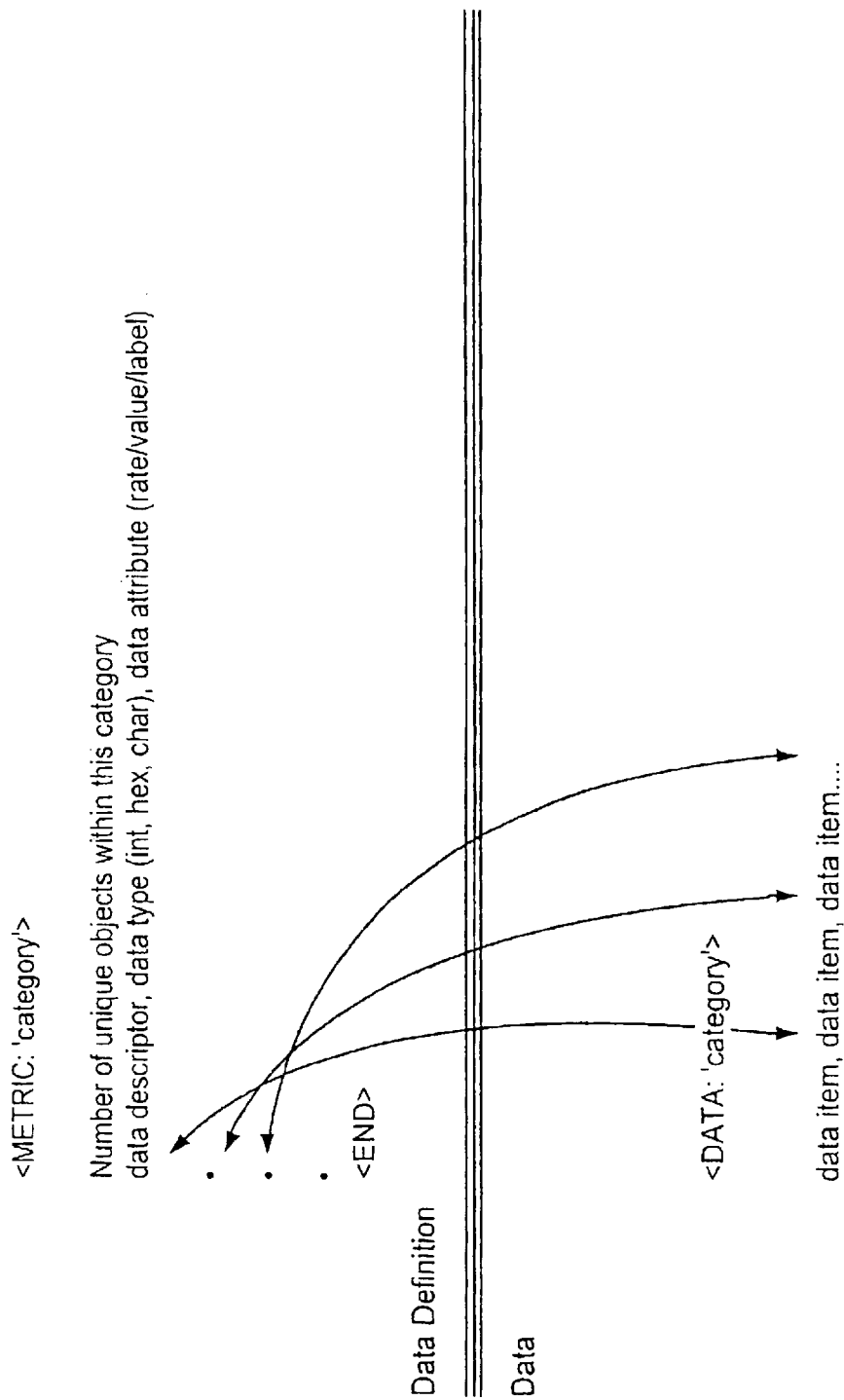
FIG. 10 is a diagrammatic illustration of a self describing data format according to the invention.

With the self-describing format according to the invention, as illustrated in FIG. 10, each data file includes a header block that contains the description and order of the periodic data. The header block is followed by a data block in which the data items are presented in the order that they appear in the data description block for that category. Two types of data are managed by the Work Load Analyzer according to the invention: Base Metrics and Derived Metrics. Base Metrics are metrics that appear in the data file sent by the agent. Derived Metrics are computed based on a set of functions that derive new metrics from the base metrics as well as from previously defined derived metrics.

Generally, the header block describes the number of unique objects within the defined category, and takes the form: data descriptor, data type, (rate/value/label). The header block format is as follows:

```
<METRIC: category>
ObjectID,p_1,p_2,p_3, ... p_n
base metric_1,p_1,p_2,p_3, ... p_n
base metric_2,p_1,p_2,p_3, ... p_n
...
base metric_n,p_1,p_2,p_3, ... p_n
derived metric_1,p_1,p_2,p_3, ... p_n
derived metric_2,p_1,p_2,p_3, ... p_n
<END>
<TIMESTAMP: yyyymmdd hhmmss>
```

The <METRIC: category> section or header block describes the order that base metrics are presented by the agent per each object within that category. Each metric definition also includes a set of parameters that describe actions to be taken by the data-manager on behalf of this metric. Derived metrics are presented in the header section following the definition of all base metrics. Derived metrics are created based on a formula using previously defined base metrics. Derived metrics are also followed by parameters describing their disposition by the data-manager.

Derived metrics are defined in a Derived Metrics Definition Table having entries setting forth:

Derived Metric Name, Function Name, Dependent Metrics List.

For example, a derived metric that represents the percentage of reads would appear as:

"Percent Read", Percent (function name), reads, total ios); wherein a function named "Percent" would receive two parameters and return the first parameter relative to the second. A variation of this function might return the percentage of the first parameter relative to the sum of all presented parameters.

The <METRIC: category> or header section is presented once at the beginning of the file and is used by the data-manager as the guide for the format of the DATA section or data block. Each base metric can be one of several metric data descriptors or metric definitions. That is, other than derived metrics wherein the metric is derived as per a formula where the formula is composed of one or more base metrics, each metric will contain one or more of the following metric descriptions:

String—metric is described as a character string;
Key—field is to be used for sorting;
SortDescending—objects to be presented in descending order based on key;
SortAscending—objects to be presented in ascending order based on key;
Long—metric is a long integer;
Float—metric is a floating number;
ConvertToRate—metric will be converted from a counter value to a rate per second;
ArchiveLast—Archives will contain last read value for this object (no conversion to rates);
ArchiveStats—converted rate to be stored in archives; or
ScaleFactor(factor)— adjust value by the given factor.

The data block generally is constructed as lines, each of which represents the data for a unique object of the respective category for a specific time interval. The data block format is as follows:

```
<DATA: category>
Object_1,base metric_1,base metric_2, ... ,base metric_n
Object_2,base metric_1,base metric_2, ... ,base metric_n
...
Object_n,base metric_1,base metric_2, ... ,base metric_n
<END>
<TIMESTAMP: yyyymmdd hhmmss>
<DATA: category>
Object_1,base metric_1,base metric_2, ... ,base metric_n
Object_2,base metric_1,base metric_2, ... ,base metric_n
...
Object_n,base metric_1,base metric_2, ... ,base metric_n
<END>
```

The <DATA: category> or data block section is presented at each time period data is collected. Here the raw data is presented using one line per Object. Each line begins with a unique object ID and is followed by the metric values associated with this object. The order of the metrics follows the order of their description in the <METRICS: category> section. Derived metrics are not presented in this section but are computed by the data-manager during processing time.

A performance view component according to the invention provides a user interface that facilitates access to the archives, and data manipulation effecting enhanced performance analysis, workload characterization and capacity planning. The performance view component facilitates generation of factory and user defined views of monitored parameters. Graphical and tabular views can be flexibly implemented. Parameters from a system can be correlated using the performance view features, and parameters across machines can be correlated as well. System configuration(s) can be viewed and changed via the performance view user interface. The performance view component can be used anywhere it is located.

The Performance View component of the Workload Analyzer according to the invention displays the performance data in a variety of graphs. In addition to traditional graphs the performance view also provides the user with two other major functions: Correlation and Configuration review.

Figure 11:
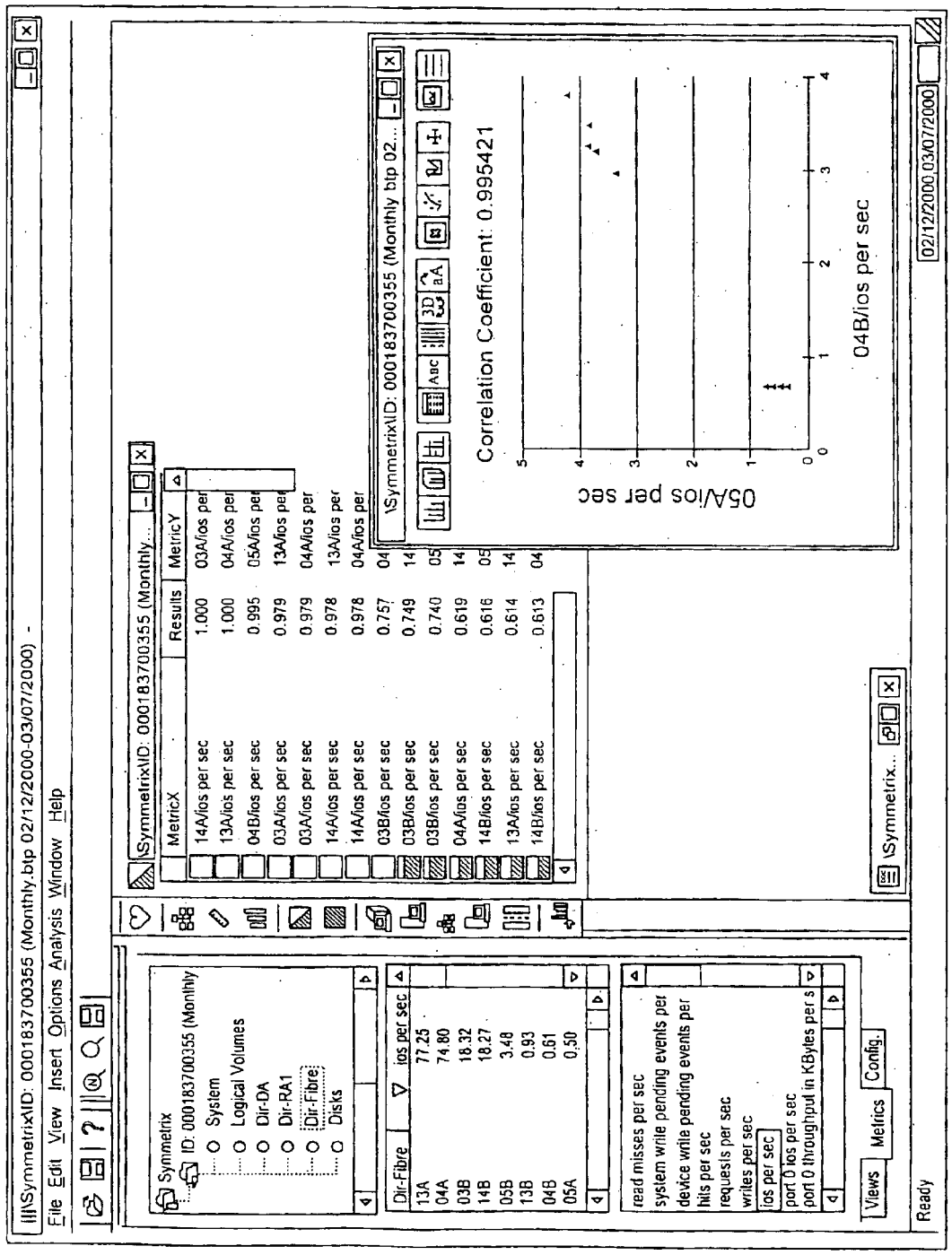
FIG. 11 is a windowed illustration of the correlation function of the performance view component according to the invention illustrating a table sorted by the coefficients of correlation for the list of objects and metrics selected.

The correlation component provides two modes of correlation. First is referred to as auto-correlation. In order to invoke auto-correlation the user selects a set of objects and an associated set of metrics then invokes the auto-correlation function. The result of this function is a table sorted by the coefficients of correlation for the list of objects and metrics selected, such as illustrated in FIG. 11. The user can then click on any of the coefficients and display a graph that visualizes the correlation between any two objects/metrics selected. The purpose of this function is to allow the user to select a single list of objects/metrics then calculate the probability of a strong dependency among any two items in the list.

The formula used, in this illustrative embodiment, to compute the linear coefficient of correlation is:

$$r = \frac{\Sigma(x_i - \bar{x})(y_i - \bar{y})}{\sqrt{[\Sigma(x_i - \bar{x})^2][\Sigma(y_i - \bar{y})^2]}}$$

This formula can be found in virtually any Probability and Statistics textbook.

Figure 12:
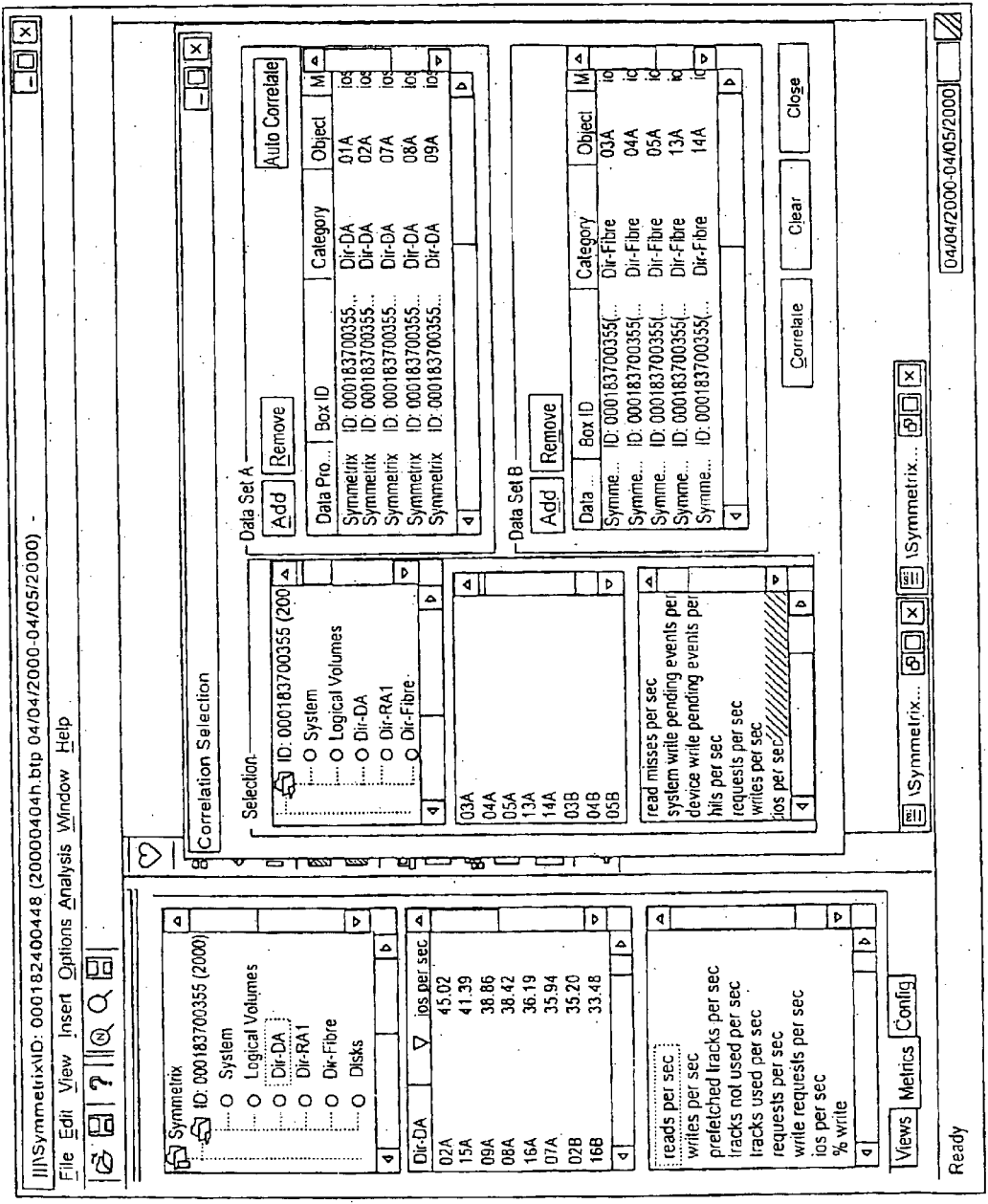
FIG. 12 illustrates a second mode of correlation of the performance view component that provides the user with the ability to select two independent lists of objects/metrics.

The second mode of correlation provides the user with the ability to select two independent lists of objects/metrics, and is illustrated in FIG. 12. In this mode, the coefficient of correlation for both lists can be computed. The output of this option is identical to that of the auto-correlation (FIG. 11).

The benefit of this feature is that it allows the user to select data from two different machines for the same time period and then see if activity on one machine correlates with activity on the second machine: This could indicate a dependency of one machine on the other.

The configuration review aspect of the Performance View component is dependent on a subset of the data file delivered by the collection manager that describes the configuration of the Symmetrix at the time that the data file was created. The data file, as described hereinbefore, contains a header section that in addition to describing the metrics also describes the configuration. An example of the format of the configuration section of the header is presented below:

```
<CONFIGURATION: LOGICAL VOLUMES TABLE>
0x000, DEV000, R2:00-0xC0, NP:00-0x00, NP:00-0x00, HS:22-0xD2, 0xFFFF, 0,
0x001, DEV001, R2:31-0xD0, NP:00-0x00, NP:00-0x00, HS:22-0xD2, 0xFFFF, 0,
0x002, DEV002, R2:01-0xC0, NP:00-0x00, NP:00-0x00, HS:22-0xD2, 0xFFFF, 0,
0x003, DEV003, R2:30-0xD0, NP:00-0x00, NP:00-0x00, HS:22-0xD2, 0xFFFF, 0,
0x004, DEV004, R2:06-0xC0, NP:00-0x00, NP:00-0x00, NP:00-0x00, 0xFFFF, 0,
0x005, DEV005, R2:25-0xD0, NP:00-0x00, NP:00-0x00, NP:00-0x00, 0xFFFF, 0,
0x006, DEV006, R2:07-0xC0, NP:00-0x00, NP:00-0x00, NP:00-0x00, 0xFFFF, 0,
.
<END>
<CONFIGURATION: HOST VOLUMES TABLE>
0x02,0x00,0x00,0x00,0x08,0x00
0x02,0x00,0x10,0x10,0x08,0x00
0x02,0x00,0x20,0x20,0x08,0x00
0x02,0x00,0x30,0x30,0x08,0x00
0x02,0x00,0x40,0x40,0x08,0x00
0x02,0x00,0x50,0x50,0x08,0x00
0x02,0x00,0x60,0x60,0x08,0x00
0x02,0x00,0x80,0x08,0x00
.
<END>
<CONFIGURATION: DIRECTORS>
01A, 4,
02A, 4,
03A, 6,
04A, 6,
05A, 6,
.
<END>
```

Figure 13:
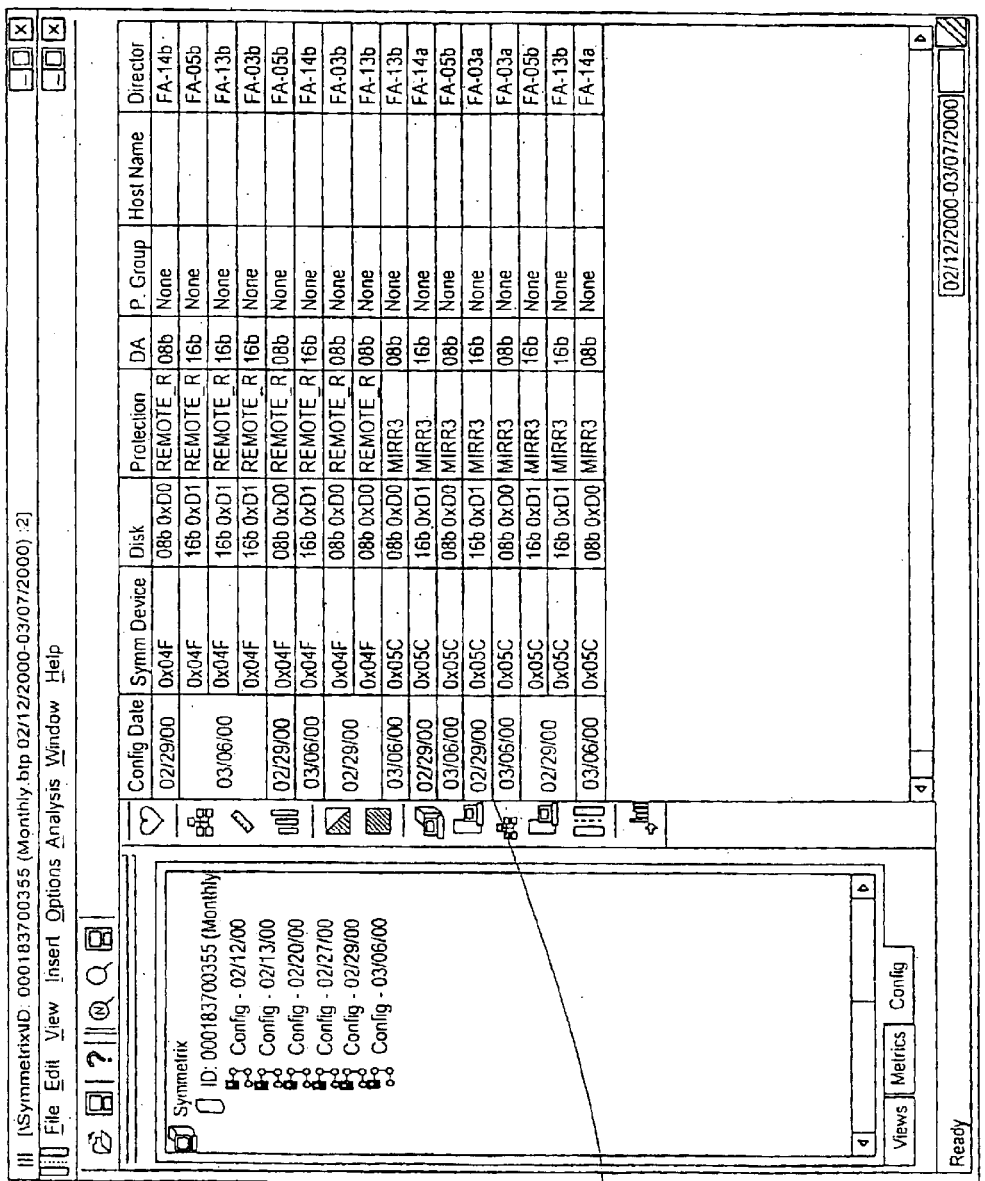
FIG. 13 illustrates how the multiple configurations are listed for a monthly data set and how configuration differences are presented to the user in a configuration view component of the performance view component according to the invention.

The Performance View component allows the user to view any configuration of a selected data-set. There are occasions whereby a data set may have multiple configurations. For example, a data set selected from the monthly archives represents data averaged over a whole month. During that month the configuration could have changed several times. A user is able to view any specific configuration as well as the changes that occurred between any two configurations. FIG. 13 illustrates how the multiple configurations are listed for a monthly data set. In addition, the table presented in FIG. 13 shows how configuration differences are presented to the user. In the case of configuration differences the data displayed represents configuration items that were present in one configuration file but not in the other. Items that were the same in both configurations are not displayed.

It should be appreciated that the performance view component can be used to implement various other graphical and windowed depictions of parameters/metrics manipulated with the workload analyzer according to the invention.

Although the illustrative Work Load Analyzer described herein according to the invention was described "launched" from the EMC Control Center (ECC), it should be appreciated that the functionality in the WLA described herein can be implemented as a standalone application, i.e. independent of any particular software (or hardware) platform.

Similarly, while the collection manager functionality described herein was illustratively configured as segregated modules including a command and control module and a data manager module, it should be appreciated that alternative divisions of functionality could be implemented and/or the functionality of the illustrative WLA according to the invention could be fully implemented in any number of modules.

The functional elements are generally implemented in software and microcode in the illustrative embodiments described herein, however it should be appreciated that the elements or modules described could be implemented as hardware, software or a combination thereof running on general purpose processors or configured in specialized circuitry such as very large scale integrated components, application specific integrated circuits, logic arrays or the like.

While the implementation of Policy as described herein included an illustrative Policy File, it should be appreciated that policy considerations and the information incident thereto could be implemented as database entries in other formats, such as in a Windows NT registry file or the like.

Although the invention is shown and described with respect to an illustrative embodiment thereof, it should be appreciated that the foregoing and various other changes, omissions, and additions in the form and detail thereof could be implemented without changing the underlying invention.

APPENDIX A

APPENDIX A symm_metrics_list

<METRIC: System>
system write pending count
<END>
<METRIC: Logical Volumes>
volume number
reads per sec
read hits per sec
writes per sec
write hits per sec
seq reads per sec
seq read hits per sec
seq writes per sec
bytes read per sec
bytes written per sec
write pending count
default write pending threshold
max write pending threshold
DA read requests per sec
DA write requests per sec
DA prefetched tracks per sec
DA prefetched tracks used per sec
DA blocks read per sec
DA blocks written per sec
total ios per sec
total hits per sec
read misses per sec
write misses per sec
total misses per sec
total seq ios per sec
% read
% write
% read hit
% write hit
% hit
% miss APPENDIX A-continued symm_metrics_list % read miss
% write miss
% seq read
% seq read hit
% seq write
% seq io
HA bytes transfered per sec
average read size
average write size
average io size
DA blocks transferred per sec
DA prefetched tracks not used per sec
<END>
<METRIC: Dir-Parallel>
director number
read misses per sec
system write pending per sec
device write pending per sec
hits per sec
requests per sec
write requests per sec
ios per sec
% hit
% write
reads per sec
% read
read hits per sec
% read hit
<END>
<METRIC: Dir-Escon>
director number
read misses per sec
system write pending per sec
device write pending per sec
hits per sec
requests per sec
write requests per sec
ios per sec
% hit
% write
reads per sec
% read
read hits per sec
% read hit
<END>
<METRIC: Dir-SA>
director number
read misses per sec
system write pending per sec
device write pending per sec
hits per sec
requests per sec
write requests per sec
ios per sec
port 0 ios per sec
port 0 throughput per sec
port 1 ios per sec
port 1 throughput per sec
port 2 ios per sec
port 2 throughput per sec
port 3 ios per sec
port 3 throughput per sec
% hit
% write
reads per sec
% read
read hits per sec
% read hit
port 0 average request size
port 1 average request size
port 2 average request size
port 3 average request size
<END>
<METRIC: Dir-DA>
director number
reads per sec
writes per sec APPENDIX A-continued symm_metrics_list prefetched tracks per sec
tracks not used per sec
tracks used per sec
requests per sec
write requests per sec
ios per sec
% write
% read
seq reads
<END>
<METRIC: Dir-RA1>
director number
ios per sec
bytes received per sec
bytes sent per sec
link utilization
last echo delay
average echo delay
maximum echo delay
<END>
<METRIC: Dir-Fibre>
director number
read misses per sec
system write pending per sec
device write pending per sec
hits per sec
requests per sec
write requests per sec
ios per sec
port 0 ios per sec
port 0 throughput per sec
port 1 ios per sec
port 1 throughput per sec
port 2 ios per sec
port 2 throughput per sec
port 3 ios per sec
port 3 throughput per sec
% hit
% write
reads per sec
% read
read hits per sec
% read hit
port 0 average request size
port 1 average request size
port 2 average request size
port 3 average request size
<END>
<METRIC: Dir-RA2>
director number
ios per sec
bytes received per sec
bytes sent per sec
link utilization
last echo delay
average echo delay
maximum echo delay
<END>
<METRIC: Disks>
device name
total SCSI command per sec
read commands per sec
blocks read per sec
write commands per sec
blocks written per sec
verify commands per sec
skip mask commands per sec
XOR write commands per sec
XOR write-read commands per sec
seeks per sec
seek distance per sec
<END>

What is claimed is:
1. Apparatus for managing and archiving performance information relating to a storage system receiving/transferring data from/to a host computer, comprising:

a collection agent configured to collect storage system performance information from said storage system;

a command and control mechanism interfaced to said collection agent issuing commands to said collection agent and receiving said storage system performance information from said collection agent, said command and control mechanism issuing at least some commands to said collection agent to collect said storage system performance information according to a user defined policy;

a data manager receiving said storage system performance information from said command and control mechanism, wherein said data manager is configured to perform computation and conversion of said storage system performance information to generate computed metrics and converted metrics; and archives receiving and storing at least one of said computed metrics and converted metrics from said data manager.

2. The apparatus of claim 1 wherein said collection agent is resident on said host computer.

3. The apparatus of claim 1 wherein said command and control mechanism is resident on an analyzer system connected to said host computer.

4. The apparatus of claim 1 wherein said user defined policy is stored in a policy file accessed by said command and control mechanism.

5. The apparatus of claim 1 wherein said command and control module issues commands to said collection agent to start or stop collection of said storage system performance information from said storage system.

6. The apparatus of claim 1 wherein said user defined policy is defined via a graphical user interface.

7. The apparatus of claim 1 wherein said user defined policy is defined via a user interface which is configured for the user to specify a storage system to be associated with a particular policy, and said particular policy including at least one of a time interval for collection of said storage system performance information, retention timing for said storage system performance information and shifts that define times for which said storage system performance information will be collected and grouped by shift association.

8. The apparatus of claim 7 wherein said shifts are defined as contiguous hours in a day and wherein a day can have more than one shift.

9. The apparatus of claim 1 wherein said data manager builds said archives selectably storing at least one of said computed metrics and converted metrics in said archives as a function of a location specified for all metrics associated with a particular storage system.

10. The apparatus of claim 1 wherein said data manager converts ASCII data received from said collection agent to binary data.

11. The apparatus of claim 1 wherein said data manager converts said storage system performance information in intervals of minutes into a base density unit of hours for storing in said archives.

12. The apparatus of claim 1 wherein said archives comprise hourly, daily, weekly and monthly archives.

13. The apparatus of claim 1 wherein at least one of said computed metrics and converted metrics are stored in said archives in a format comprising a header block, a configuration block and a data block.

14. The apparatus of claim 13 wherein said header block describes types of metrics including base metrics and derived metrics computed using at least one base metrics.

15. The apparatus of claim 1 further including a performance viewing component that correlates at least one of said computed metrics and converted metrics with viewing of storage system configuration information.

16. The apparatus of claim 1 wherein said storage system performance information includes at least one of system write pending count, volume number, reads per second, writes per second, director number, read misses per second, system write pending per second, device write pending per second, device name, total SCSI command per second and read comments per second.

17. A method for managing and archiving metrics relating to operation and performance of a storage system receiving/transferring data from/to a host computer, said method comprising the steps of:

collecting metrics relating to operation and performance of said storage system from said storage system at said host computer;

transferring said collected metrics from said host computer to an analysis system according to a user specified policy;

converting said collected metrics to a base density unit for time density compression; and archiving said collected metrics according to said time density compression.

18. The method of claim 17, wherein said step of collecting metrics from said storage system involves a collection agent running on said host computer.

19. The method of claim 18 further including the step of converting ASCII data received from said collection agent to binary data for archiving.

20. The method of claim 17 further including a step of specifying a collection policy including at least one of a time interval for collection of said metrics, retention timing for said metrics and shifts that define times for which metrics will be collected and grouped by shift association.

21. The method of claim 20 wherein said step of specifying a collection policy further includes designating shifts defined as contiguous hours in a day and wherein a day can have more than one shift.

22. The method of claim 17 wherein the step of archiving collected metrics involves archiving base metrics obtained from said storage system and further includes the step of computing derived metrics based on at least one base metrics.

23. The method of claim 17 wherein said step of archiving collected metrics involves archiving metrics as one of interval collected metrics, hourly collected metrics, daily collected metrics, weekly collected metrics and monthly collected metrics.

* * * * *